Patented Sept. 7, 1948

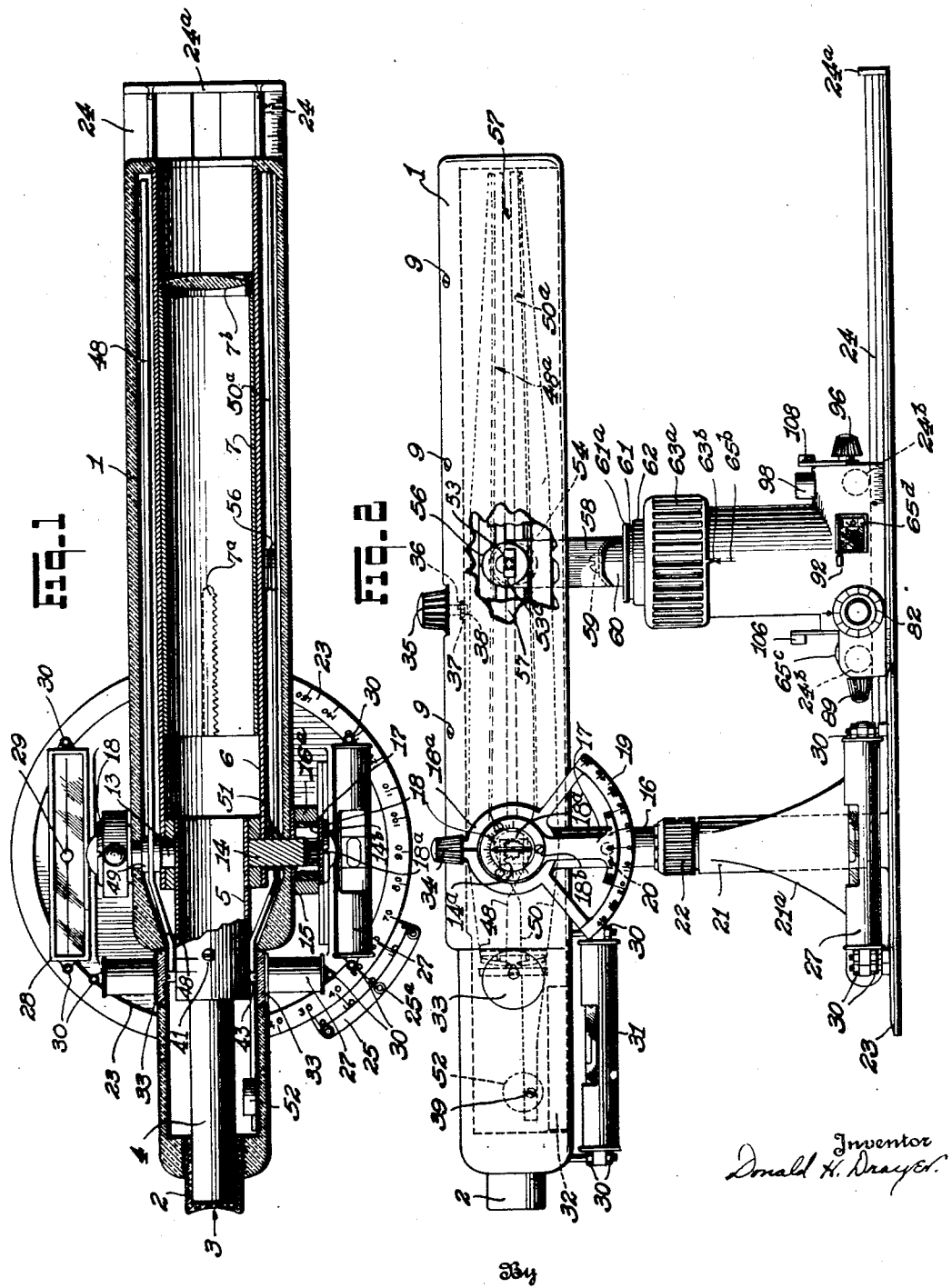

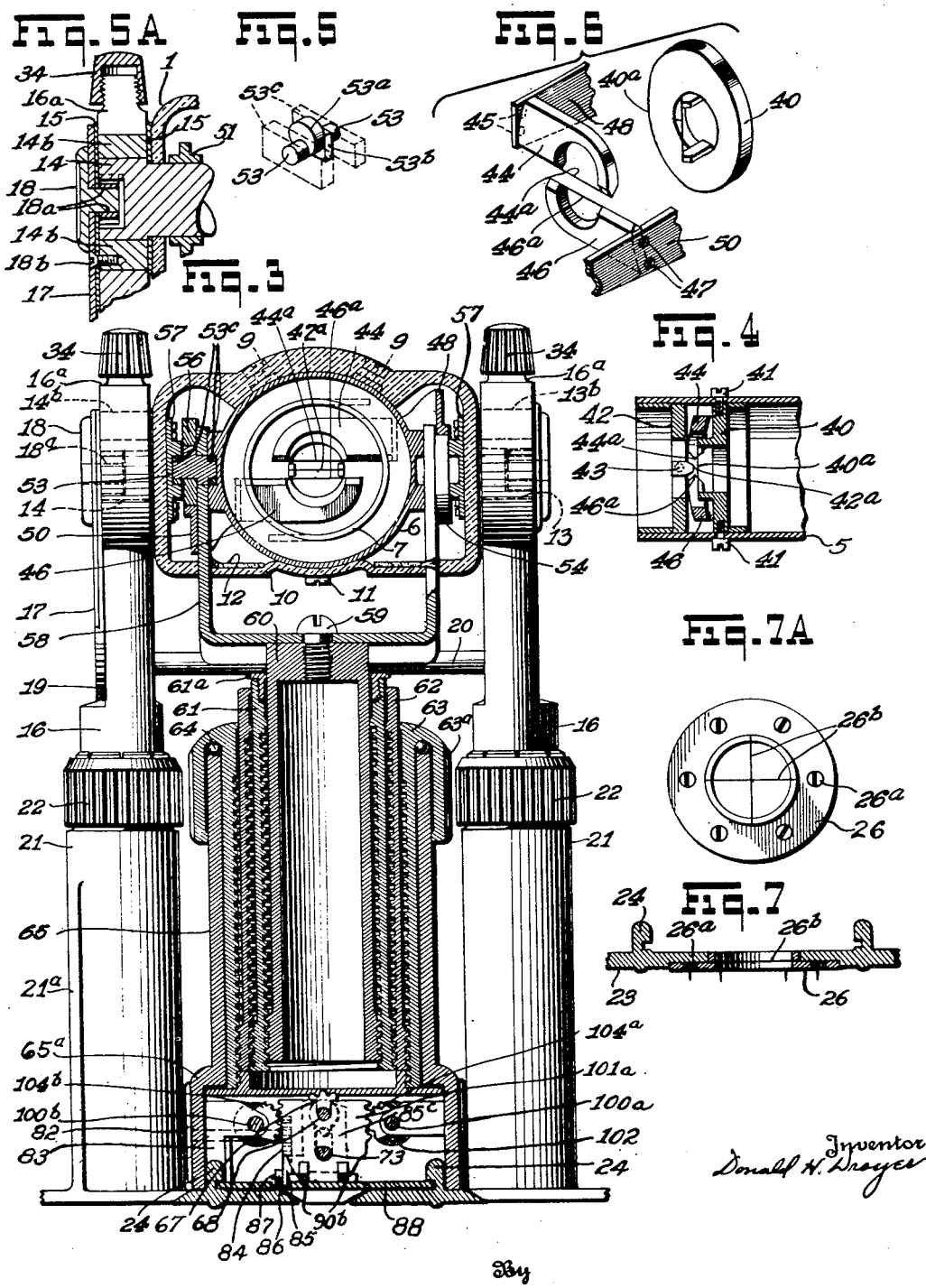

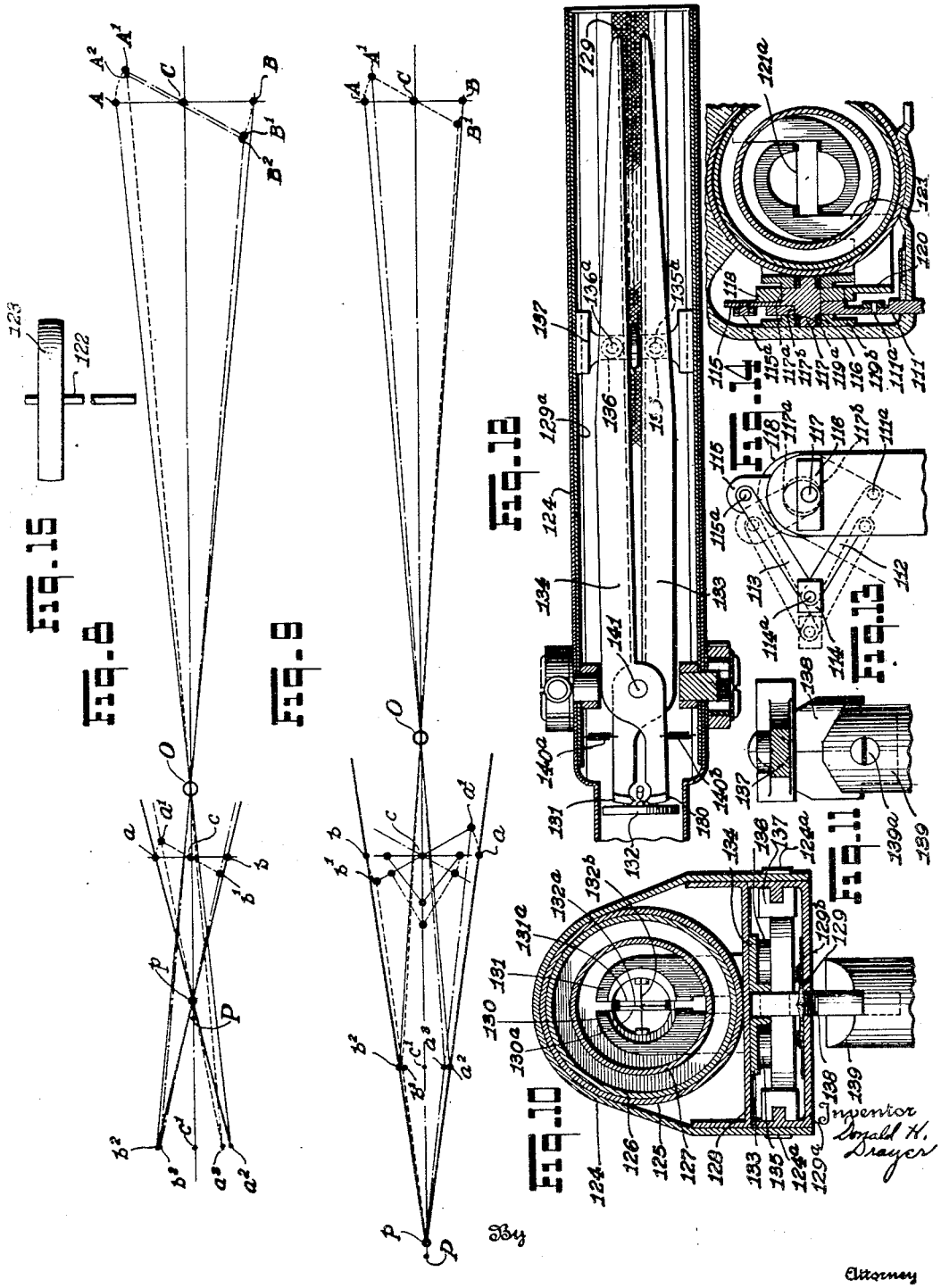

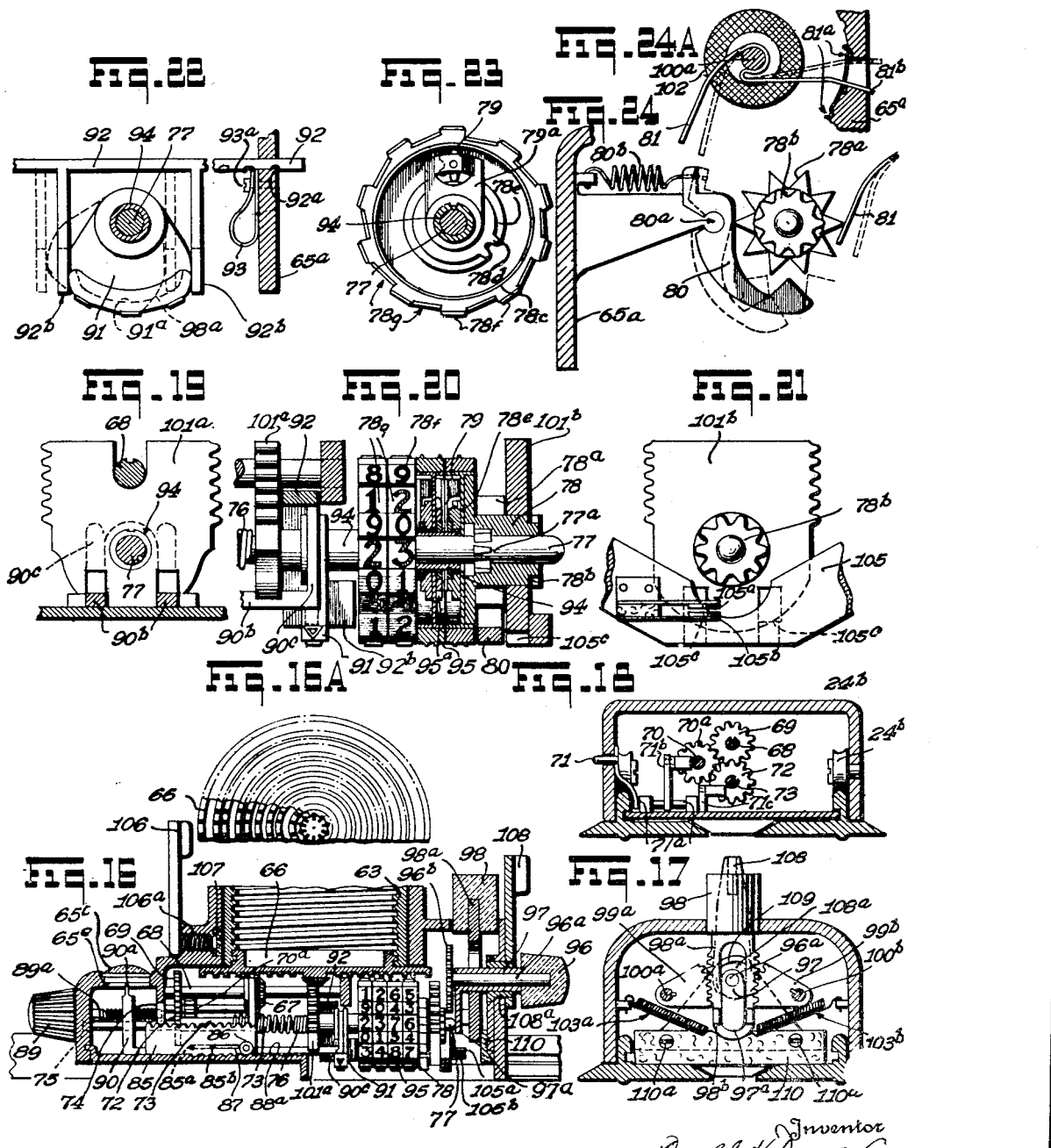

2,448,965

UNITED STATES PATENT OFFICE 2,448,965

AUTOMATIC RECORDING STADIA INSTRUMENT

Donald H. Drayer, Brookmont, Md.

Application September 9, 1943, Serial No. 501,705

18 Claims. (Cl. 346—2)

My invention relates to the art of mapping and more particularly to the mapping of hydrographic or geographic features by means of a plane table and stadia instrument, which employs movable stadia hairs to determine distance.

Heretofore it has been suggested that the distance between the stadia hairs bears a definite relationship to the distance from the point of observation to the object observed and to the distance between the points on the object in line with the lines of sight from the stadia hairs through the instrument. However, in all prior art arrangements, of which I am aware and in which movable stadia hairs are used, it is necessary to use a horizontal stadia rod or other means of correcting for angular views of an otherwise vertical stadia, and among other objections to known arrangements, no means are provided to record numerically the elevation of the object viewed.

The conventional method of mapping by plane table is to set up the table in the field over a reference point of known elevation and use an instrument provided with a flat straight edged base which rests directly on the mapping surface. A reference point is established on the map to correspond to the point on the ground and the direction to any point in the field may be established on a line parallel to the straightedge base of the instrument when it is directed at the point in the field. The optical portion of the conventional instrument is designed to rock about a horizontal axis and is provided with a scale for reading the vertical angle of the instrument with respect to the horizontal. The instrument is also provided with a pair of fixed horizontal stadia hairs which are usually spaced a predetermined distance apart in order that the length of stadia rod viewed between the hairs, called the intercept, at one hundred feet will be one foot.

It is common practice to provide one member of the surveying party, known as the "recorder," who writes in a field book the reading of the intercept. From tables, usually provided, he determines the true distance to the rod by correcting for the angular view or foreshortening of the rod if the view is other than horizontal. If the markings on the rod are not already compensated for a value known as "$f+c$," this value is added to the true distance and by use of trigonometry he then determines the horizontal and vertical projections of the true distance. The horizontal distance is scaled upon the map from the reference point and the vertical projection is added to the height of the instrument to determine the elevation of the point in the field which is written on the map near the point just established.

It can readily be seen that in addition to taking valuable time, during which the remainder of the surveying party is usually idle, this method allows numerous opportunities for error and if all such calculations could be automatically and instantly calculated and recorded directly on the map for any common scale, considerable time would be saved and a higher degree of accuracy obtained.

With this end in view, after considerable research and experimentation, I have developed an instrument which possesses all of the desirable aforementioned features. By means of my improved arrangements, greater range and accuracy is possible with less eye strain since by using movable stadia hairs, a plain stadia rod may be employed which carries two fixed clearly defined targets and instead of counting small and minute spaces on the stadia rod, it is only necessary to bring the movable stadia hairs in line with the targets. In addition, the present invention is readily applicable to hydrographic mapping for which purpose the elevation calculating and recording mechanism is adjusted to print consecutive numbers.

It is now the practice of hydrographic surveyors to equip a boat with a recording supersonic sounding device and employ a draftsman on the boat to plot the course of the boat from periodic readings taken simultaneously by two persons with sextants directed on two separated shore stations. These readings being timed with markings on the graph of the supersonic recorder provide means for correlating the recordings on the graph with the plotted course of the boat.

The use of the instrument of the present invention will permit one person, instead of three, to plot the course of the boat from a shore station where the plotting board would be much steadier than possible on board a boat. Consecutive numbers would be plotted on the map periodically each time the operator would bring the stadia on the boat in the line of sight with the stadia hairs of the instrument. With the printing of each number, an electrical impulse would be initiated, with proper apparatus, to transmit a tuned radio signal which would be received at the boat and by means of suitable relays to print on the graph of the sounding instrument numbers identical with those plotted on the map at the shore station.

In general, this invention, in its preferred form, consists briefly of: an optical portion mounted on a horizontal axis and supported on uprights which are attached to a base plate and track; a combination of pivoted levers in connection with said optical portion, acted upon by movable rollers eccentrically positioned with reference to a slide provided for the axis of said rollers to move said levers to which stadia hairs are attached; an elevation calculating device consisting of extendable threaded telescopic cylinders coupled with a multi-ratio transmission combined to move along said track beneath the optical portion of the instrument; and a counting and printing mechanism suitably connected to said transmission to record functions of the extension of said elevation calculating device.

Broadly, it is the object of my invention to provide a mapping instrument which when directed at an object of fixed known dimension such as a rod carrying two fixed targets and adjustments are made on the instrument to bring movable stadia hairs into line of sight with the object or two fixed targets, the azimuth, distance from the point of observation and elevation of the object or spot upon which the rod rests are directly readable from suitable scales associated with the instrument or automatically plotted upon the map upon which the instrument may rest.

It is further the object of my invention to provide a stadia instrument having means to register measurements to scale of the horizontal distance from the observer to a distant vertical stadia rod and automatically correct those measurements for the foreshortened angular view of the rod.

Also, it is the object of my invention to provide a stadia instrument having means to automatically correct, both the horizontal scaled measurement and the numerical elevation registered for a distant geographic feature, for the value known as "$f+c$."

Another object of my invention is to provide an instrument having means to register and record numerically for any of several scales of maps, the elevation of a distant geographic location.

In addition, it is the object of my invention to provide an instrument having an improved means for moving the stadia hairs to register scaled distances to objects viewed in connection with a stadia rod, wherein the means so provided may be closely associated with the optical portion of the instrument and be combined therewith in a dustproof enclosure.

Another object of my invention is to provide an automatic registering and recording stadia instrument having means whereby the operational adjustments required to register distance, azimuth and elevation of a distant object may be made by the operator simultaneously.

It is also the object of my invention to provide a simplified means of hydrographic mapping wherein means will be provided to map from a shore station, or a fixed point, directly on the map either the true depth which is positioned to correspond to the location of the spot where the sounding is being made or correlated numbers which are registered simultaneously on the map and on the graph of the supersonic recording device aboard the sounding boat, such numbers on the map being located to correspond to the location of the boat at the time of the recording.

Further, it is the object of my invention to provide a fraction discarding mechanism for counting devices which is adapted for use with the present invention.

A still further object of my invention to provide a universal type of target for a stadia rod for use with instruments having movable stadia hairs which will give equal readings from any angle likely to be encountered.

With these and other objects in view which may be incident to my improvements, the invention consists in the parts and combinations to be hereinafter set forth and claimed, with the understanding that the several necessary elements comprising my invention may be varied in construction, proportions and arrangements without departing from the scope and spirit of the appended claims. Specifically, though shown herein combined with an optical instrument of the erecting type, this invention may easily be adapted to any of the optical instruments used for surveying. The application of the invention may also take any of several forms, one preferred form of embodiment of which with two modified arrangements are hereinafter described with reference to the drawings which accompany and form a part of this specification.

In the drawings:

Fig. 1 is a plan view of the instrument with the outer casing shown in section to reveal interior parts.

Fig. 2 is a side elevational view of the instrument showing by dotted lines certain interior levers.

Fig. 3 is an end elevational view of the instrument looking from the front toward the eye piece with the main optical part and the elevation recording mechanism of the instrument shown in section.

Fig. 4 is a longitudinal sectional view through the portion of the instrument containing the stationary and movable hairs.

Fig. 5 is an isometric view of one of two stub shafts with rectangular slides shown by dotted lines.

Fig. 5A is a sectional detailed view of an axis-offsetting mechanism.

Fig. 6 is an isometric view showing the bracket holders for the movable stadia hairs with a portion of the levers to which they are attached and a holder for the stationary vertical cross-hair.

Fig. 7 is a cross section view through the center of the base of the instrument showing the centering device in section.

Fig. 7A indicates a plan view of the centering device.

Fig. 8 is a diagram illustrating the principle of the instrument.

Fig. 9 is a diagram illustrating a modified arrangement of the instrument.

Fig. 10 is a section through the optical portion of a second modified arrangement of the instrument showing the movable stadia hairs and their holders in elevation.

Fig. 11 indicates in side elevational view and section a detail of Fig. 10.

Fig. 12 is a partial plan section of the instrument of Figure 10, taken immediately below the optical portion to show the levers and rollers which operate the movable vertical stadia hairs.

Fig. 13 is a side elevational view of a detail of the supporting bracket to be used with the modification represented by Figure 9 with the action shown by dotted lines.

Fig. 14 is a partial section through the optical portion of the modification represented by Figure 9 with a vertical cross section taken through the part shown in detail in Fig. 13.

Fig. 15 is an elevation of a circular "T" headed universal stadia rod.

Fig. 16 is a partial vertical cross section through the center of the base of the counting and recording mechanism showing certain parts in elevation.

Fig. 16A is a partial plan view of the underside of the multi-ratio crown gear.

Fig. 17 is a transverse vertical section through the base of the counting and recording mechanism to the right of center.

Fig. 18 is a transverse vertical section through the base of the counting and recording mechanism to the left of center and looking to the right in Figures 2 and 16.

Fig. 19 is an elevational detail of the left bearing for the counting and printing mechanism.

Fig. 20 is a part elevational and part sectional detail view of the counting and printing mechanism.

Fig. 21 is a detail of the right hand bearing for the counting and printing mechanism with radio relay switch.

Fig. 22 is a detail elevational view of the reference symbol printing wheel with selector mechanism.

Fig. 23 is a detail elevational view of the interior of a typical counting dial and tens carrying mechanism.

Fig. 24 is a detail elevational view of the fractions discarding mechanism, and the dead center eliminator.

Fig. 24A is a detail elevational view of the selector mechanism for printing consecutive numbers with the counting dials.

DESCRIPTION

OPTICAL PORTION

An outer casing (1) of metal or composition provides a cover for the working parts of the optical portion of the instrument. A smaller casing 2 provides an eye piece 3 and supports one end of a small metal cylinder 4 which holds four lenses. An intermediate sized cylinder 5 carries the adjustable stationary cross hairs. A large metal cylinder 6 contains a similar cylinder 7 which carries the object lens 7b and is movable along the axis of the instrument to effect the proper focus. This focusing is accomplished by turning knob 35 attached to shaft 36 which turns pinion 37 which acts against a rack formed on one edge of a notch 7a (shown in dotted projection Fig. 1) cut in cylinder 7. The opposite side of notch 7a is smooth and bent downward to ride against shoulder 38 on the end of shaft 36. The rack, being of sufficient length, permits cylinder 7 to be advanced far enough to allow the cleaning of the object lens 7b.

Outer cylinder 6 is secured to the outer casing (1) by two lines of tap screws 9. The bottom of the casing 1 is made dustproof by plate 10 secured by screws 11 to outer cylinder 6 and two strips of plush fabric 12 attached to plate 10 form a dust stop on either side of movable forked bracket 58.

Two pins 13 and 14 are adjustably connected to two slotted rings 13b and 14b on which the instrument may be rocked and/or offset the horizontal axis of the instrument with respect to the vertical axis by a predetermined amount. This offset is accomplished by turning dials 18 (Figs. 2, 3 and 5A) provided with an index which indicates on suitable graduations on part 17, the amount of the offset. Part 17 is secured to ring 14b with screws 18b and a hole in part 17 provides a bearing for dial 18. Pinion 18a attached to dial 18, when turned clockwise meshes with and acts against rack 14a provided with teeth engaging with those of the upper shank of pin 14 to move the body of the optical portion of the instrument forward with respect to the supports 16. On the opposite side of the instrument but not shown, a similar dial 18 is arranged to operate with a similar pinion and a rack provided on the shank of pin 13 to offset both axis pins 13 and 14 a like amount. The above mentioned shanks of pins 13 and 14 are provided with top and bottom plane surfaces parallel to the optical axis of the instrument and are arranged to slide in slots provided in rings 13b and 14b. Thus the offset effected by turning dials 18 is limited to the direction of the optical axis of the instrument. The slotted rings 13b and 14b turn in the split rings 16a which are formed as the upper portion of two circular supporting posts 16 tied together by rod 20 (Fig. 3). The posts 16 fit into two cylindrical supports 21 the upper portions of which are split and are clamped tightly to the post by the tightening down of tapered ferrules 22. The top of each split ring 16a terminates in two tapered threaded segments which clamp together on rings 13b and 14b by the tightening down of taper threaded screw caps 34 securing the instrument from rocking on its horizontal axis. Arm 17 the end of which is provided with a vernier scale to be used with protractor 19 for reading vertical angles is attached by screws 18b to ring 14b and rocks with the instrument. A washer 15 serves to eliminate side movement of the instrument on the horizontal axis.

The supporting cylinders 21 with their corresponding braces 21a are attached to circular base plate 23 whose outer circumference is marked to form a protractor. The track 24 as indicated in Figs. 1 and 2 is formed in two parts which unite at the base plate 23 and are tied together at the opposite end by strap 24a. On the base of the track each section is provided with a raised ridge which bears on the surface of the map. When the instrument is used to measure azimuth, a short segment of a circular ring 25 used as a vernier index is provided with three downward pending pin pointed screws 25a which secure it to the plane table in meridional position.

A centering device 26 (Fig. 7) which secures the vertical axis of the instrument to the plane table, is provided with an upturned flange which is designed to fit into an opening in the center of the circular base plate 23. Fig. 7A indicates the location of six pin pointed screws 26a which project downward securing the centering device to the plane table. To further aid in centering the device over a selected point two cross wires 26b are provided.

Attached to circular base plate 23 are two spirit levels 27 disposed horizontally at right angles to each other to aid in leveling the plane table. A glass covered case 28 containing a compass needle 29, is provided for determining magnetic directions. Secured beneath the instrument is another spirit level 31 for use in leveling the instrument. All spirit levels are supported on studs provided with leveling nuts 30. A counter balance weight 32 is indicated by dotted lines in Fig. 2 to assist in balancing the instrument about its horizontal axis. A circular opening 33 is provided in the casing of the instrument for access to interior adjustments.

As indicated in Figs. 1, 2, 3, 4, and 6, the instrument is provided with stationary vertical and horizontal cross-hairs 40a and 42a supported by two rings 40 and 42 which are held in place and adjusted by screws 41 and 43.

Levers

Designed to move in approximately the same plane with the fixed cross-hairs, are two movable horizontal stadia hairs 44a and 46a which are carried on two brackets 44 and 46 indicated in isometric view Fig. 6. The brackets 44 and 46 are attached by screws 45 and 47 to the rear end of levers 48 and 50 respectively. Lever 48 is attached to ring 49 and rocks on pin 13. Lever 50 attached to ring 51 rocks on pin 14. Both levers are provided with flanges defining straight edges 48a and 50a as indicated in Fig. 2 by dash dot lines and short dash lines respectively. Straight edge 48a when parallel to the longitudinal axis of the instrument is .375" above the axis and straight edge 50a is .375" below the axis. Straight edge 48a is pulled downward by the force of gravity while straight edge 50a is forced upward because of the force of gravity upon counter weight 52 attached to the opposite end of lever 50 by set screw 39.

Straight edge 48a is brought to rest tangent to the top surface of eccentric roller 54 whose radius is .375" and is pivoted .075" below the axis of cylinder 7 on a bearing surface 53a described below. Similarly straight edge 50a comes to rest tangent to the bottom surface of roller 56 which is pivoted .075" above the axis of cylinder 7 as shown in section in Figure 3. (It is to be noted that the dimensions given above are not fixed but might vary with other conditions such as the focal length of instrument or position of horizontal axis with respect to the stadia hairs, etc.) Referring to isometric view Fig. 5, stub shafts 53 each having an eccentric circular enlargement 53a between its ends, have their ends resting rotatably in rectangular slide blocks 53c (indicated by dotted lines). Two grooves milled in channels 57 attached to the outer casing (1) and two grooves milled in projections provided on the sides of cylinder 6, all shown in Figure 3, but omitted in Figure 1, form guides for slides 53c. Shaft 53 is provided with one concentric square shoulder 53b which fits in an opening provided in bracket 58. Adjacent to the square shoulder is the above mentioned enlargement 53a which is eccentric by .075" in a direction parallel to one side of the square shoulder 53b.

The action of this device is as follows: When bracket 58 is maintained at right angles to the visual axis of the instrument and moved away from or toward the above-defined horizontal axis of the instrument, the straight edges 48a and 50a of levers 48 and 50 move apart or together respectively while the opposite ends of the levers to which brackets 44 and 46 are attached, move proportionally in an opposite direction. If bracket 58 is at an angle other than right angles to the visual axis of the instrument, as would be the case if the instrument were pointed above or below the horizon, then the eccentrics 53a will cause roller 54 to be moved upward while roller 56 will be moved downward. This action will cause levers 48 and 50 to follow and thus bring the movable stadia hairs closer together. It will be noted also that the eccentrics 53a also advance or retard rollers 54 and 56 with reference to the horizontal axis of the instrument depending on whether the instrument is pointed above or below the horizon. For example, if the instrument is pointed upward at an angle of 30 degrees, then the visual axis of the instrument will make an angle of 60 degrees with the stadia rod, and bracket 58 will make an angle of 60 degrees with the visual axis of the instrument. Thus relative to the distance between points on the visual axis at the rod and at the crosshairs, the distance from stadia hair 46a to the top target of the rod will be lengthened and the distance from stadia hair 44a to the bottom target on the rod will be shortened. Likewise one of the eccentrics 53a will move roller 54 through an arc of 30 degrees toward the visual axis of the instrument. This shortens the leverage to correspond to the shortened distance to the lower target on the stadia rod. Roller 56 which operates stadia hair 46a will similarly be advanced.

Diagrammatic explanation

Referring to Fig. 8, there is diagrammatically illustrated an instrument having its object lens at (O), stadia hairs at $(a^2)$ and $(b^2)$ horizontal axis at (P), pivot for levers at (p), with the center of the stadia rod at (C). The center corresponding to stub shaft 53 is at (c). The upper target on the stadia rod is indicated by (A), the lower by (B), eccentric center of roller 56 by (a) and eccentric center of roller 54 by (b). Line $(c^1—C)$ represents the visual axis of the instrument, lines $(a^2—a)$ and $(b^2—b)$ represent levers 50 and 48 respectively and $(b^2—B)$ and $(a^2—A)$ represent the lines of sight through the instrument. If the distance between the targets (A—B) and the distance between the eccentric centers (a—b) be known, the relationship of $$\frac{(A—B)}{(a—b)}$$

may be determined. By similar triangles (OAB) is similar to $(Oa^2b^2)$ and $(pa^2b^2)$ will be similar to (pab), therefore the distance $$\frac{(A—B)}{(O—C)}=\frac{(a^2—b^2)}{(O—c^1)}$$

and $$\frac{(a^2—b^2)}{(p—c^1)}=\frac{(a—b)}{(p—c)}$$

therefore $$\frac{(O—C)}{(p—c)}=\frac{(O—c^1)\times(A—B)}{(p—c^1)\times(a—b)}$$

and since all the distances on the right hand side of the equation are known any distance (p—c) will have a fixed relation to (O—C) the distance $(O—c^1)$, $(p—c^1)$ and (a—b) are fixed by the design of the instrument but (A—B) may be varied to change the scale of map as desired. This formula is as follows:

(A—B) in inches for any scale=

$$\frac{1}{scale}\times\frac{(p—c^1)\times(a—b)}{(O—c^1)}$$

The instrument indicated (Figs. 1 and 2) being designed with dimensions as $(p—c^1)=2''$, $(a—b)=.15''$ and $(O—c^1)=12''$. Using the formula above and substituting: the distance between the targets on the stadia rod for a scale of map where $1''=100'$ $$(A—B)=\frac{1}{\frac{1}{100'\times12''}}\times\frac{2''\times.15''}{12''}=30''$$

To represent the condition when the instrument is pointed at an angle Fig. 8 will again be referred to and the line denoted by ($A^1$—$B^1$) representing the stadia rod will be shown turned 30 degrees about C and the line ($a^1$—$b^1$) representing the eccentric will be turned 30 degrees about C. The extension of the dotted line $a^1$—$a^3$ representing the new location of lever 50 and the dot dash line $b^1$—$b^3$ representing lever 46 locates the new position of the stadia hairs $a^3$ and $b^3$. Now if the lines of sight be extended as indicated by the dotted lines ($a^3$—O—$A^2$) and ($b^3$—$OB^2$), it will be seen that ($A^2$) practically coincides with ($A^1$) and ($B^2$) with ($B^1$). This error is due to the different proportion between triangle (O—$A^1$—$B^1$) and triangle ($p$—$a^1$—$b^1$) but does not exceed allowable tolerances. However, if it is deemed advisable to eliminate this small error, which is only discernable when using the instrument for steep angles, fixed compensating cams may be substituted for the rollers 54 and 56.

*First modification*

Referring to Fig. 9, a modified arrangement of levers is illustrated wherein the instrument is designed with its horizontal axis nearer the eye piece of the instrument and the movable stadia hairs are attached to the levers on the same side of the horizontal axis as the straight edges of the levers. Because of this it becomes necessary to reverse the movement of the eccentrics when viewing an object above or below the horizontal in order to shorten the lever which operates the stadia hair which is in the shortened line of sight with the target. Fig. 9, being lettered to correspond to Fig. 8, operates in a similar manner and will be understandable to one versed in the art without repetition of the explanation made for Fig. 8.

Figs. 13 and 14, indicate a preferred method of reversing the eccentrics by the use of levers wherein lever 112 is pivoted at one end to pin 111a attached to one side of bracket 111 which corresponds to bracket 58 of the preferred form described above. The other end of lever 112 is pivoted to a pin 114a attached to a slide 114 that moves in the same groove with rectangular slide 116 which carries one end of stub shaft 117. The lever 113, also pivoted to the same pin 114a, has its other end pivoted to pin 115a attached to an arm 115 which is attached to stub shaft 117. Stub shaft 117 is provided with an integral eccentric 117a which carries roller 118 and with a concentric circular portion 117b which bears in bracket 111. Thus for example, when the instrument is pointed upward through an angle of 30 degrees, bracket 111 will make an angle of 30 degrees with the visual axis of the instrument as indicated by the dotted lines in Fig. 13, and since slide 114 is held in a groove provided by bars 119a and 119b, arm 115 attached to the eccentric will be turned through an angle of 30 degrees to the visual axis of this instrument but in an opposite direction. The lever 120 shown in section in Fig. 14 carries bracket 121 which carries movable stadia hair 121a, the other parts of the Fig. 14 are similar to those indicated in Fig. 3 and are fully described above.

*Second modification*

Referring to Figs. 10, 11, and 12, another modified arrangement of parts is indicated wherein the levers which operate a pair of movable stadia hairs, are positioned under the optical portion of the instrument instead of on either side as described heretofore. The stadia hairs in this case being positioned perpendicular to a plane through the above defined horizontal axis and parallel to the visual axis of the instrument, will, for purposes of brevity, be called "vertical" stadia hairs though this is only strictly true when the instrument is level. With "vertical" movable hairs it becomes necessary to use a horizontal cross head on the stadia rod to carry the targets which must be held perpendicular to the line of sight in order to obtain correct readings, or a circular cross head such as a band with a diameter equal to the calculated fixed stadia intercept distance as illustrated in Fig. 15 where staff 122 supports circular band 123 whose surface is a center segment of a sphere. Though indicated as a horizontal head (Fig. 15), the circular band 123 may be turned vertically to eliminate the need for correcting for foreshortening when this stadia is used with an instrument employing horizontal movable stadia hairs.

This type of instrument with "vertical" stadia hairs is somewhat simpler than one with movable horizontal stadia hairs in that no correction for foreshortening is required and for hydrographic purposes the circular horizontal type of stadia would have special advantages. With a circular horizontal stadia located directly above the sounding apparatus on board a boat, the direction of the boat and tilt would have little effect on a reading from a shore station.

Fig. 10 shows an instrument composed of an outer casing 124 containing a fixed cylinder 125, and a movable cylinder 126 which carries the object lens (not shown). There is also provided an interior concentric cylinder 127, one fixed horizontal cross-hair 132b and one fixed vertical cross-hair 132a attached to ring 132. The outer casing is stiffened with a U-shaped strip 128. The brackets 130 and 131 which carry "vertical" movable stadia hairs 130a and 131a are attached to levers 134 and 133 respectively which are pivoted about pin 141 (Fig. 12). Two angular base cover plates 129a and 129b are each provided with a projecting flange and are attached to the outer casing by screws 124a. The space between the angular base plates is made dustproof by two strips of plush fabric 129. The projecting flanges provide a guide for an H-shaped bracket 137 which carries two rollers 135 and 136 which are free to turn on pins 135a and 136a.

Levers 133 and 134 are provided with two downward projecting straight flanges which when parallel are spaced with their outer surfaces a distance which is exceeded slightly by the space between the tangent surfaces of rollers 135 and 136. Springs 140a and 140b tend to force the flanges of levers 133 and 134 against rollers 135 and 136. Thus it can be seen that when the said rollers are brought nearer to the horizontal axis of the instrument, they allow the levers to spread apart. This separates the movable stadia hairs 130a and 131a attached to the opposite ends of the levers. When the rollers are moved away from the horizontal axis, the opposite is true.

The center of the H-shaped bracket 137 which carries the rollers is provided with a central circular section which is concentric with a line parallel to the horizontal axis of the instrument. This circular section is loosely clamped by two bars 138 which slide between the fabric strips 129 and are attached by screw 139a to the center cylinder 139 of an altitude measuring device, to be described later, which is similar to corresponding cylinder 60 (Fig. 3).

The pins which form the horizontal axis of the instrument are identical in all important respects with parts 13 and 14 (Fig. 1) previously described.

Both the "first modification" and the "second modification" would be provided with similar base plates, supports, spirit levels, altitude measuring device, etc., described heretofore and hereinafter, as belonging to the preferred form as illustrated (Figs. 1 2, and 3).

It is to be noted that although the forms of the invention described herein use two movable stadia hairs each, they will operate with one fixed and one movable hair and whereas only one lever is illustrated to move each movable stadia hair, a pair of levers working in parallel may also be used.

Elevation measuring device

The elevation measuring device (Figs. 1, 2 and 3) is similar to a telescopic screw jack with three concentric inside threaded cylinders 61, 62, and 63 and an inner cylindrical core 60 which supports bracket 58 attached by screw 59 and an outer supporting cylinder 65 which is part of base 65a which forms the outer casing of the printing device. The base 65a is provided with four free rollers 24b which bear on track 24 (Figs. 2 and 18). The upper rim of cylinder 65 is provided with a depression which carries ball bearings 64 which support the outer of the turnable cylinders 63. Cylinder 63 is provided with a hand grip 63a and the inner threaded surface supports telescopic threaded cylinders 61 and 62 which are provided with threads only at the lower portions of their outer surfaces. The upper inner portion of each cylinder is provided with a shoulder which will stop the upper of the threads mentioned above and prohibit the cylinders from becoming disengaged. Cylinder 61 is provided with a projecting rim 61a which prohibits cylinder 61 from dropping below the bottom of cylinder 62 where it could become disengaged. Into the base of cylinder 63 is screwed a circular plate 66 which is deformed on its under surface (Figs. 16 and 16a) to form a crown gear with nine concentric rings of teeth and a center bevel gear.

For each ring of teeth there is a corresponding position for a pinion gear 67 which is keyed to shaft 68 for sliding adjustments as explained below. It is desirable to provide an arrangement by which the indication of elevation printed by the printing device will correspond with the scale that is used in preparing the map. The observer will normally select a convenient scale, relating actual distance to distances plotted on the map. This will be used for horizontal distances on the map. Having selected such a scale, he will select the proper gear ratio as indicated below, to correspond with the horizontal scale that he is utilizing, so that the numbers printed will be the proper numbers corresponding to the altitude of objects whose horizontal distance is indicated on the same map. The gears will provide convenient integral multiples, corresponding to the usual mapping scales. A 12 toothed gear 69 secured to shaft 68 is geared directly to sliding gear 72 keyed to shaft 73, which has its bearings in an opening 75 provided in base 65a and bracket 74. The number of teeth selected for the concentric crown gears 66 (Fig. 16A) provides correct indicated elevations to correspond to a wide selection of the scales used in mapping. With the cylinders 61, 62 and 63 threaded 10 threads to the inch and gears 67, 69 and 72 each provided with 12 teeth, the 12, 24, 36, 48, and 60 toothed crown gears will provide indicated elevations to correspond to the following mapping scales respectively 1″=10′, 20′, 30′, 40′ or 50′ or any multiple of those numbers by 10, such as 1″=100′, 200′, 300′, 400′, etc. The 10 toothed bevel gear and the 20, 30, 40, 50, and 60 toothed gears will provide elevations corresponding to the following scales respectively 1:100, 1:200, 1:300, 1:400, 1:500, and 1:600 or any decimal division of those scales such as 1:2000, 1:3000, 1:4000, etc., for either the English or metric systems.

The teeth on plate 66 are arranged so that in two positions the teeth are in line. This is possible because the number of teeth in each concentric ring is divisible by two thus providing two points on the circumference of the plate 66 where the gear 67 may be shifted with ease. Two marks 65b (Fig. 2) on the outer cylinder 65 with corresponding index 63b on the hand grips 63a indicate to the operator the position of these two points. Gear 67 is shifted as described below by turning of dial 82 (Figs. 2 and 3) which is calibrated into eleven positions corresponding to the ten selectable gear ratios and neutral which occurs when gear 67 is slid to the left past the edge of plate 66.

Dial 82 is attached to shaft 83 (Fig. 3) which carries pinion gear 84 which is geared to rack 85. Rack 85 in turn is provided with a fork 85c which fits loosely into a groove provided on gear 67. Thus any movement of dial 82 is transferred to slide gear 67 on shaft 68. In order to hold gear 67 at any selected position, a small roller 86 is attached to rack 85 by a piece of bent spring steel wire 87 which is passed through the rack 85 at 85b and back again at 85a. The opposite end is bent through the roller 86 to form its axle. Tension in the wire 87 holds the roller 86 against a row of notches 88a provided in base cover plate 88 thus securing the rack 85 in any position selected.

Means is also provided for reversing the altitude measuring device in order to indicate values of elevation below the datum plane. For example, the recording mechanism should be reversed if the instrument is to be used for registering direct readings on a map taken from a rod used in shallow hydrographic soundings. For this purpose thick idler gear 70a (Figs. 16 and 18) is caused to slide on shaft 70 to a position where it meshes with gear 69 on shaft 68. At the same time, gears 69 and 72 are unmeshed and gear 70a is brought into mesh with gear 72. This shifting of gears is produced by the movement of arm 71 attached to shaft 71a (Fig. 18) which in turn carries two arms 71b and 71c which are of different lengths. Arm 71b carries a pivoted fork which brackets gear 70a while arm 71c carries a pivoted fork which brackets gear 72. Fig. 16 indicates the gear 70a idle; however, if the lever 71 (Fig. 18) be pulled toward the spectator thick gear 70a will be required to move a distance partly past gear 69. The shorter lever 71c will only move gear 72 far enough to disengage it from gear 69 but gear 70a will also overtake gear 72 and become engaged with it. This sets up a train of gears which will reverse the normal direction of shaft 73.

Counting mechanism

The main drive shaft 73 drives the counting mechanism through a flexible coiled spring 76 which serves three purposes. First the spring 76 serves as a universal joint allowing the counting device to remain connected while moving in a vertical plane; second the spring 76 acts as a compression spring holding shaft 77 (Fig. 20) engaged with primary counting wheel 78; third, spring 76 acts to take up the torque in either direction which may be caused by the fractions discarding device described below. This centering device illustrated in detail in Fig. 24 is designed to use the movement of depressing the printing dial to discard fractions. This device will add or subtract the fraction, depending whether it is more or less than one half and provides in addition a novel means for handling exact one half fractions to eliminate dead centering of the mechanism. The mechanism is arranged with a 10 pointed star gear 78a which, during the printing process, is pressed over a pointed projection of lever 80 thereby causing the star gear 78a to be turned in one direction or the other unless the notch between the teeth of the star gear is already centered over the point of lever 80. Should a point of the star gear 78a fall dead center on point of lever 80, then the lever 80 will rotate against tension spring 80b about pivot 80a integrally cast as a portion of the base of the elevation measuring device 65a thereby moving point of lever 80 in an arc which will rotate star gear 78a through an arc of 1/20 of a circle to center the printing device for printing.

Referring to Figs. 20 and 23, the counting mechanism is a type commonly used in automobile speedometers where the "tens" carrying device is inclosed by the dial 78c. The Geneva movement consists of a two toothed gear 78d and a rim with a single depression 78e, attached to dial 78c, which turns intermittently a six toothed idler gear 79 which is carried by a thin metal frame 79a keyed to the fixed hollow shaft 94. The portion of gear 79 which fits over rim 78e has every other tooth removed thereby locking gear 79 until the depression on rim 78e is in position to allow it to turn through 1/3 revolution being impelled by the two toothed gear 78d. The 1/3 revolution of gear 79 drives a 20 toothed gear 95a attached to the next higher order through 1/10 revolution for each revolution of the lower order. Successive dials are similarly equipped to carry the "tens" to the next higher order.

The exposed rim of all dials is divided into 20 parts with every other part raised and provided with a small type face 78f numbered 0 to 9 inclusive. The depressed spaces 78g between the type faces are provided with plastic strips which are numbered with larger numerals corresponding to the type face three places in advance. Thus by looking through the magnifying glass 65c built into the base of the elevation measuring device, (Fig. 2), the numbers on the plastic strip attached to the dials indicate the numerals which are in position to be printed. The outer rim as well as the type face of each dial is to be formed of a porous metal such as is disclosed in U. S. Patent No. 2,199,265, issued April 30, 1940, to Carl N. Lohrey, which will carry ink for printing. In normal position each type face runs against an absorbent felt inking spool 102 four of which are provided on shaft 100a (Figs. 3 and 24A).

In order to set the counting mechanism, thumb turn 96 attached to shaft 96a, which turns in tube 97, is pressed inward moving tube 97 with it. An arm 97a attached to tube 97 presses on the end of shaft 77 against spring 76 to disengage the teeth 77a (Fig. 20) of shaft 77 from similar teeth provided to receive them cast in part 78. At the same time, pressing in on shaft 96a engages gear 96b with a 10 toothed gear 78b also cast as part of casting 78 allowing the numbering device to be regulated by thumb turn 96.

In order to print the figures on the counting device a button 98 is depressed. Button 98 is attached to bar 98a which is provided with a rack on both edges (Fig. 17). The bottom of bar 98a is provided with a notch into which is fitted a strand of wire continuous with and joining tension springs 103a and 103b. These springs support the type printing dials until button 98 is pressed. The racks on the edges of bar 98a are geared to two segmental pinions 99a and 99b which are keyed to shafts 100a and 100b. To each of the shafts 100a and 100b are keyed two segmental pinions 104a and 104b (Fig. 3) of approximately ½ the radius of pinions 99a and 99b. Pinions 104a and 104b are geared to the racks on the edges of two castings 101a and 101b (Figs. 19, 20, and 21) which form the bearings for the fixed hollow shaft 94 and shaft 77 through casting 78. Thus by depressing the button 98 the printing dials are pressed against the surface of the map with a pressure equal to approximately twice that placed on the button because of the gear ratio described above. To guide the bearings 101b and 101a vertically, notches are provided in them which fit over two lugs 105c attached to brace 105 and portion of arms 90b respectively.

Consecutive numbering means

To print consecutive numbers on the map instead of elevations a downward pending portion of spring 81 (Figs. 24 and 24A) is placed in position to advance the numbering device 1/10 turn by acting against a point of the 10 pointed star gear 78a when the printing device rises in returning to its normal position after printing. The spring 81 is bent around shaft 100a in such a manner that two shoulders formed on it exert an outward pressure against cover strip 81a through which the handle end 81b of spring 81 passes, and which moves laterally with it. Strip 81a is provided on either end with bent protrusions which fit into depressions provided on the inner surface of base 65a, to hold the spring 81 in either of the positions indicated by the dotted or solid lines (Fig. 24A). When printing consecutive numbers, gear 67 (Fig. 16) is shifted into neutral position beyond the edge of multiple crown gear 66, as previously described.

Means are also provided to initiate an electrical impulse for each act of printing by arranging lug 98b (Fig. 17) on bar 98a to close contact between electrical contacts 105a and 105b (Figs. 16 and 21) when button 98 is depressed for printing.

The purpose of printing consecutive number and initiating electrical impulses is for use of the instrument in plotting from a shore station the location of a boat making hydrographic soundings as heretofore mentioned.

Locking levers

To lock the elevating device at any fixed elevation, as would be required in taking contour shots at the stadia rod (regardless of the relation between the elevation of the contour and the instrument), there is provided a lever 106 (Fig. 16) which is attached to screw 106a which is threaded into the casing 65a. The opposite end of screw 106a is fitted with a block 107 of suitable brake lining material which is clamped tightly to cylinder 63 upon turning lever 106 to the right.

To lock the recording device to track 24, as would be required in taking shots at the stadia on a circumference of a circle of a fixed radius (regardless of the elevation of the circle with reference to the instrument) there is provided a lever 108 (Fig. 16) which is attached to a sleeve 108a which has its opposite end formed into a cam. The cam on sleeve 108a fits into a circular opening in plate 109 (Fig. 17) to which is secured (by two screws 110a) a suitable brake lining material 110 which is clamped against track 24 upon turning lever 108 to the left.

Miscellaneous

Means are provided to make lineal corrections for any scale of map selected. Thumb turn 89 (Figs. 2 and 16) attached to screw 89a is threaded through and moves part 90 in a line parallel to the instrument. Part 90 is provided with an index 90a which is readable through glass 65c on a suitable scale 65e attached to the casing 65a of the registering mechanism. Part 90 is formed into two rectangular bars 90b which are bent up at 90c (Fig. 20) to embrace a circular portion of a notch provided in a segmental printing wheel 91 (Fig. 22) which is free to slide on a hollow shaft 94. Thus any turn given to thumb turn 89 is transmitted to the segmental printing wheel 91 to move it longitudinally with the instrument. Segmental printing wheel 91 is provided with raised type forming three symbols, a square, a circle and a triangle which serve as reference points for the printed elevations.

The printing wheel 91 is made of a suitable porous metal to absorb and transmit the ink and is also provided with a cup 91a (viewed in dotted lines in Fig. 22), which will contain a wick for holding ink. The proper symbol for the point being viewed is selectable by pressing on a bar 92 which carries downward pending arms 92b to embrace the sides of printing wheel 91 to rock it on hollow shaft 94 as indicated by the dotted lines (Fig. 22). The bar 92, which projects from either side of the base of the instrument, is provided with three notches 92a which receive the curled end of spring 93 (Fig. 22), which is attached by screw 93a to the interior of the casing of the recording device 65a to form a friction catch which secures bar 92 at the selected position.

Correction for "f+c"

To correct the scaled distances being plotted for error due to the change of focus of the instrument and location of the object lens with respect to the vertical axis of the instrument, a constant value known as "f+c" (by one familiar with the art) in which F represents the focal length of the objective and C represents the distance between the vertical axis of the instrument and the objective, must be added to the scaled distance or otherwise be compensated for. The significance of this quantity, long familiar to those in the civil engineering art, is fully explained and indicated, for instance in Merriam "American Civil Engineers' Handbook," 4th edition, page 90. This value, though constant, to be plotted, must vary according to the scale of the map and when taking shots other than horizontal, should be transposed into horizontal and vertical components and added both to the horizontal scaled measurement and the elevation.

Although this is seldom done in actual practice because the percentage of the error is small and the calculations would become tedious, nevertheless the accomplishment is desirable. By the novel means of offsetting the horizontal axis of the instrument through the centers of slotted rings 13a and 14a with respect to the pins 13 and 14 which form a pivot for levers 48 and 50, a distance equal to the scaled value of "f+c" and by making this offset in a line with the visual axis of the instrument as indicated by the distance P—p (Figs. 8 and 9), the correction for "f+c" is automatically compensated for, both horizontally and vertically and need not enter the mind of the operator again so long as the scale of the map being plotted is unchanged.

Having described my invention, I claim:

1. In a surveying instrument, an optical observing system in which stadia wires are aligned with an external target, pivoting means providing a horizontal axis of rotation, whereby the optical observing system can be rotated thereon, movable means holding a stadia wire, means responsive to the angular displacement of the optical observing system about said horizontal axis to apply a correction factor to the indicated position of the said stadia wire, and means to indicate the position of the said stadia wire corrected for the angle of the optical observing system.

2. In an apparatus of the class described, an optical observing system mounted upon a standard and rotatable about a horizontal axis relative to the said standard movable indicia within the said optical system, a longitudinal track extending from the said standard, auxiliary supporting means movable along the said longitudinally extending track and partially supporting the said observing system, means to raise and lower the said supporting means, means to measure the extent of raising and lowering of said auxiliary supporting means, and means carried by said auxiliary supporting means cooperating with said indicia to control the position thereof.

3. In an apparatus of the type described, an observing telescope, movable stadia hairs in the field of view of the telescope, a supporting standard for the said telescope, a longitudinal track extending therefrom, an auxiliary supporting member mounted on the track and adapted to move longitudinally thereon, means upon the said auxiliary member to control the position of the stadia hairs, and additional means to modify the position of the stadia hairs in response to the regular angular displacement about a horizontal axis of the said observing telescope.

4. In an apparatus of the class described, a telescope having a movable index therein, a supporting member therefor, an auxiliary supporting member located at a different point along the axis of the said telescope, the said auxiliary member having a jack screw and nut to raise and lower the said telescope, means to indicate the extent to which the said telescope has been raised and lowered, and means operated additionally by the said jack screw and nut to change the position of the said index within the said telescope.

5. In an apparatus of the type described, an observing telescope, a pair of levers having longitudinal bearing portions, the said levers being pivotally mounted proximate to the said telescope, a pair of indices at one of the termini of each of the said levers, a pair of guide members bearing upon the said bearing portions of the said levers, the said guide members being adapted to move longitudinally along the said levers, means responsive to the angular displacement of the said telescope relative to a datum plane, to shift said guide members transversely of said levers in response to the said angular displacement, and means responsive to the position of the said guide members and the correcting means for indicating the elevation of and distance to a target observed through the said telescope.

6. In an apparatus of the class described, an observing optical system rotatable about a horizontal axis so as to render its optical axis alignable with a line joining the apparatus and an external object sighted upon by the optical system, whereby the angle of the said optical system relative to a datum plane will be related to the altitude of the object sighted upon, means to modify the angle of the said optical system about the said horizontal axis, the said means including a rotatable member, the rotation of which is related to the extent of rotation of the said optical system about the horizontal axis, gearing means coupling the said rotatable member to an indicator, the said gear system having a selector gear capable of meshing with any of a plurality of gears within the said gear system, each one of the said plurality of gears corresponding to a predetermined scale value for motion of the said optical system, the movement effected by the rotatable member being correlated in magnitude with the respective gear ratios in the gear train so as to operate an indicator coupled to the gear train in predetermined ratio, whereby the movement of the said optical system by the said rotatable means may be indicated directly to scale.

7. In an apparatus of the class described, an optical observing system, means to adjust the said observing system in conformity with the altitude of an external object, means operable by said adjusting means to indicate the altitude of the object to which the optical system has been adjusted, the said adjusting means and indicator being interconnected by means of a gear train, and means to reverse the motion of the indicating means relative to the adjusting means as compared with the usual mode of operation thereof to indicate negative elevation directly.

8. In a recording apparatus in which an indicating dial is provided adapted to be set only to definite predetermined angles about its axis of rotation, and which is to indicate the position of a shaft which is capable of being set to any angle about its axis of rotation, a common supporting structure holding the said dial and the said shaft with their axes in substantially parallel relation to one another, said supporting structure comprising means to support the shaft in rotatable relation about its axis and additional means holding the dial and movable over a limited range relative to the said shaft in a direction parallel to the longitudinal axis of the said shaft, a coil spring being mounted axial with said shaft and attached to both said shaft and said dial and constituting the sole coupling for angular rotation between the said shaft and dial, such spring being adapted to transmit the angular motion of the said shaft to said dial, but being sufficiently flexible so as to permit slight angular adjustment of the dial relative to said shaft, further being sufficiently flexible so that the dial may be displaced laterally and axially relative to the said shaft without loss of rotational coupling therebetween.

9. In an apparatus for indicating the degree of rotation of a shaft, a common support holding the said shaft in rotatable relation about its axis, and further holding indicating means to indicate the degree of rotation of the said shaft, means comprising a coil spring connecting the said shaft and indicating means and adapted to transmit the rotational motion of the said shaft to the said indicating means, the indicating means including a member movable relative to and substantially axially of the said shaft, but held in normal operating position by the compression of the said coil spring, and means to disengage the said movable member from the indicating dial upon movement of the said movable member against the compression of the said spring, whereby the indicating means may be oriented independently of the position of the shaft and then re-engaged by permitting the said movable member to assume its normal operating position.

10. In a justifying mechanism for a recording apparatus, a support holding a dial, a star wheel and a movable member, the star wheel being mounted substantially coaxially with the said dial and rigidly connected therewith, a projection mounted upon the movable member, said member being movable relative to the said support, the projection co-acting with the gaps of the star wheel so as to cause motion thereof, means to move the star wheel bodily laterally relative to the projection so as to be in engagement therewith and rotated thereby to one of a set of justified positions predetermined by the gaps of said star wheel the said member being pivoted upon said support at a point displaced laterally from the center of rotation of the indicating dial and having limited rotational motion thereabout, whereby when the projection engages with one of the points of the star wheel, it will have a limited displacement with a tangential component relative to said star wheel, so as to enter a gap between adjacent points of the star wheel.

11. In a justifying mechanism for moving a dial to one of a number of predetermined positions, a dial, a toothed wheel affixed thereto, and a member to engage with the toothed wheel, all mounted upon a frame, the toothed wheel and dial being rigidly connected to one another and rotatable relative to said frame, the toothed wheel having apices and gaps therebetween, the member having a complementary portion, the frame holding the member and wheel in operative relation to one another, means to move the said wheel bodily laterally relative to said member so as to cause insertion of said apex in the spacing between the teeth to justify the said dial, the member being pivoted upon the frame about a center laterally displaced from the center of the wheel, further having limiting means to limit the rotation of the member about said center whereby the said member will move substantially tangentially of the said wheel, so that in cases in which the apex of the member mates with the apex of a tooth, the said member will move the said limited amount tangentially and justify the dial, whereby the justifying operation will take place, regardless of the point along the circumference of the said toothed wheel at which contact is made with the said lever.

12. In an apparatus of the class described, a base, an observing telescope journaled on the base to pivot about a horizontal axis, a pair of levers pivoted intermediate their ends proximate to the telescope having longitudinal bearing portions, indices supported on one of the termini of each of the said levers, the said indices being within the telescope, an auxiliary support comprising elevating means for said telescope and carrying rollers bearing upon the said bearing portions of said levers, said base having guiding means to guide the said support along a horizontal path at right angles to said horizontal axis, means carried by the said support responsive to and in accordance with the angular displacement of the said telescope relative to the support about the said horizontal axis to shift the position of the axes of said rollers relative to their support and means controlled by said elevating means for indicating elevation of a target observed through the telescope, whereby the indicated elevation will be corrected for the angular displacement of the said telescope relative to the support.

13. In an apparatus of the class described, a support, an optical observing system supported thereby having a field of view and an optical axis, the said system having a horizontal transverse axis, about which the optical system is journaled to rotate, an objective spaced from the said horizontal axis, an index within the field of view in the said system adjustable laterally in relation to the optical axis so that its position may be modified in relation to the apparent dimensions of the image of a distant object seen in the optical system, adjusting means to move said index and operate indicating means in response to the said movement to indicate to scale directly the elevation of said distant object, and means for securing translation of the optical system relative to said support and associated with the said indicating means to apply automatically to the indicated elevation a correction for the focal length of the objective and the distance between the horizontal axis and the objective.

14. In an instrument of the class described, an assembly having a base with a plane under surface adapted to be supported upon a plane horizontal supporting surface capable of receiving indicia thereon, an optical system in the said instrument having an optical axis and fiducial element therein movable relative to said axis so as to be alignable in conformity with the apparent position of a distant object viewed by the said optical system, printing means, means to modify the position of the said fiducial element relative to said axis and printing means, said modifying means also being mechanically linked to said printing means whereby the said printing means will designate a value determined at least in part by the position of the said fiducial element, said printing means being supported above the said supporting surface and movable relative thereto and into engagement therewith to print thereon indicia indicative at least in part of position of said fiducial element within the said optical system.

15. In an apparatus of the class described, a base supporting an optical system having an optical axis to sight upon a distant object, a fiducial element within the optical system and viewed thereby movable in relation to the said optical axis in conformity with the apparent position of the said distant object as seen within the optical system, said base being adapted to rest upon a plane horizontal supporting surface capable of receiving indicia thereon, a guiding member extending from said base, printing means, a series of printing wheels forming part of said printing means, the said printing means being movable as a body upon and guided by the said guiding member, the position of the said printing wheels being mechanically related to the position of the said fiducial element, the said printing means being mounted above the said supporting surface, and manually operated means to move the printing wheels into contact with the supporting surface whereby the said wheels will print upon the said surface, indicia in the form of printed numerical values dependent upon the relation of the said element to the optical axis.

16. In an apparatus of the class described, a horizontal plane supporting member capable of receiving indicia thereon, an optical observing instrument readily removably placed upon the said supporting member to sight upon a distant object, means to adjust the position of a fiducial element within the said optical system and viewed thereby relative to the axis of the said optical instrument in conformity with the apparent position of the distant object as viewed by said optical system, printing means linked mechanically to the adjusting means and indicia forming part of said printing means set in conformity with the extent of adjustment of the said fiducial element, the said printing system being mounted above the supporting surface and vertically movable in relation thereto upon manual operation thereof to print upon the said surface indicia indicative of the extent of adjustment of the said element.

17. In an optical system for determining the altitude of a distant object, a plane horizontal supporting surface capable of receiving printed indicia thereon, a base supporting an optical system having an optical axis, a fiducial element within the said system movable relative to said base in conformity with the altitude of and into apparent coincidence with a distant object sighted upon by the said optical system, means to move the fiducial element relative to said base, a printing system, indicia forming part of said printing system, means simultaneously operable and mechanically linked with the said moving means and printing system to alter the indicia within the printing system in relation to the position of the said fiducial element and therefore to the altitude of the distant object, and manually operated means to operate the printing system to print upon the supporting surface indicia as altered by said altering means whereby there will be printed on said surface indicia indicative of the altitude observed by the said optical system.

18. An alidade of the plane table type having a flat under surface adapted to be removably placed upon a flat horizontal supporting surface, the said surface being adapted to hold a map to be made from the observations of the said alidade, an optical observing system, means for adjusting a sighting element in the said optical system in response to the apparent position of an external object sighted upon by said optical system, a printing mechanism, indicia forming part of said printing mechanism, means simultaneously and automatically operable by said adjusting means to modify said indicia within the printing mechanism in accordance with the degree of adjustment at said adjusting means and means to operate said printing means to print said indicia directly upon the map on the said supporting surface.

DONALD H. DRAYER.

REFERENCES CITED

The following references are of record in the file of this patent:

UNITED STATES PATENTS

| Number | Name | Date |
| --- | --- | --- |
| 324,395 | Marichal | Aug. 18, 1885 |

(Other references on following page)

| Number | Name | Date |
|---|---|---|
| 467,895 | Mayson | Jan. 26, 1892 |
| 769,526 | Armstrong | Sept. 6, 1904 |
| 825,605 | Laska | July 10, 1906 |
| 840,904 | Bump | Jan. 8, 1907 |
| 884,245 | Waugh | Apr. 7, 1908 |
| 903,143 | Tekyl et al. | Nov. 3, 1908 |
| 918,190 | Von Nagy | Apr. 13, 1909 |
| 1,048,718 | McCormick | Dec. 31, 1912 |
| 1,180,555 | Viardot | Apr. 25, 1916 |
| 1,432,309 | Thompson | Oct. 17, 1922 |
| 1,432,570 | Roux | Oct. 17, 1922 |
| 1,638,914 | Brush | Aug. 16, 1927 |
| 1,759,482 | Gendron | May 29, 1930 |
| 1,820,187 | Gaynor | Aug. 25, 1931 |
| 1,826,582 | Szabo | Oct. 6, 1931 |
| 1,896,284 | Bryce | Feb. 7, 1933 |
| 2,079,957 | Clifton | May 11, 1937 |
| 2,111,516 | Roux | Mar. 15, 1938 |
| 2,153,215 | Torkelson | Apr. 4, 1939 |
| 2,199,265 | Lohrey | Apr. 30, 1940 |
| 2,239,460 | Levy | Apr. 22, 1941 |
| 2,253,721 | Meer | Aug. 26, 1941 |
| 2,257,233 | Gallasch | Sept. 30, 1941 |
| 2,278,203 | Lepetit | Mar. 31, 1942 |
| 2,349,506 | Lowkrantz | May 23, 1944 |

FOREIGN PATENTS

| Number | Country | Date |
|---|---|---|
| 23,968 | Great Britain | Oct. 17, 1910 |
| 353,637 | Italy | Oct. 22, 1937 |
| 384,705 | Germany | Nov. 5, 1923 |